United States Patent
Asaro et al.

(10) Patent No.: US 9,505,572 B1
(45) Date of Patent: Nov. 29, 2016

(54) PRINTER WITH AUTOMATIC PAPER SHEET COUNT DISCOVERY

(71) Applicant: INTERNATIONAL BUSINESS MACHINES CORPORATION, Armonk, NY (US)

(72) Inventors: Alessandra Asaro, Rome (IT); Giulia Carnevale, Rome (IT); Marco Gianfico, Sant'Antimo (IT); Roberto Ragusa, Lucera (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/988,872

(22) Filed: Jan. 6, 2016

(51) Int. Cl.
- B65H 7/00 (2006.01)
- B65H 7/02 (2006.01)
- G06K 15/16 (2006.01)
- B65H 1/04 (2006.01)
- G01G 17/02 (2006.01)

(52) U.S. Cl.
CPC .... B65H 7/02 (2013.01); B65H 1/04 (2013.01); G01G 17/02 (2013.01); G06K 15/16 (2013.01)

(58) Field of Classification Search
CPC .......... B65H 2220/01; B65H 2220/03; B65H 2220/09; B65H 2301/541; B65H 7/04; B65H 7/14; B65H 7/02
See application file for complete search history.

(56) References Cited

U.S. PATENT DOCUMENTS

| | | | |
|---|---|---|---|
| 4,716,978 A | 1/1988 | Wales et al. | |
| 5,992,841 A * | 11/1999 | Fujii | B65H 5/16 271/3.02 |
| 6,801,304 B2 | 10/2004 | Todome | |
| 8,302,959 B2 | 11/2012 | Ikeuchi et al. | |
| 2002/0135628 A1 | 9/2002 | Kolodziej | |
| 2003/0014385 A1 * | 1/2003 | Chow | G06Q 10/08 |
| 2004/0085565 A1 * | 5/2004 | Owen | G06Q 10/06 358/1.14 |
| 2004/0114127 A1 * | 6/2004 | Todome | B65H 7/00 355/407 |
| 2005/0030517 A1 * | 2/2005 | Todome | B65H 7/00 355/407 |
| 2010/0225047 A1 * | 9/2010 | Yoshimura | B65H 3/44 271/9.07 |
| 2011/0141181 A1 * | 6/2011 | Ito | B41J 29/10 347/16 |
| 2012/0121280 A1 * | 5/2012 | Nakano | G03G 15/556 399/35 |
| 2012/0146282 A1 * | 6/2012 | Chiba | B65H 1/14 271/160 |
| 2012/0219309 A1 * | 8/2012 | Yoshioka | G03G 15/1605 399/45 |
| 2014/0210158 A1 * | 7/2014 | Rasmussen | G03G 15/6552 271/207 |

* cited by examiner

*Primary Examiner* — David Banh
(74) *Attorney, Agent, or Firm* — Patrick J. Daugherty; Driggs, Hogg, Daugherty & Del Zoppo Co., LPA

(57) ABSTRACT

Aspects provide for a printer with automatic paper sheet count discovery, via determining an initial weight of printer paper sheets within a printer paper feeder tray. A single sheet is removed from the paper feeder tray to a staging area of the printer, and a revised weight is determined for the sheets within the paper feeder tray while the single sheet of paper is removed to the staging area. The single sheet is fed back into the paper feeder tray via a printing path bypass of the printer. The weight of the single sheet determined as a function of the difference between the initial weight and the revised weight. A quantity of printer paper sheets currently loaded within the paper feeder tray and available to satisfy a print job is determined as equal to the initial weight divided by the weight of the single sheet.

17 Claims, 3 Drawing Sheets

US 9,505,572 B1

PRINTER WITH AUTOMATIC PAPER SHEET COUNT DISCOVERY

BACKGROUND

The term "printer" as used in the present application will be understood to refer to a hardware device or system that is in network or circuit communication with a computer or other programmable device and execute print jobs in response to commands from said programmable device. Printers may print ink and other media onto a variety of "paper" print mediums or coatings disposed thereon, including onto plain and coated wood-based paper surfaces, into films disposed onto paper materials in photo paper mediums, onto transparency film or paper surfaces that are translucent, etc. It will be understood that the term "paper" as used herein may refer to any print medium printed upon by a printer.

In operation a user generally sends a print job to a printer by entering an appropriate "print" command within an application executing on the programmable device. While some applications provide dialog windows that inform the user of a variety of settings and print options that may be selected or revised to change attributes of execution of the print, the prior art generally fails to determine and inform the user if there are enough paper sheets in a paper supply tray to print an entirety of the submitted print job.

BRIEF SUMMARY

In one aspect of the present invention, a method for a printer with automatic paper sheet count discovery includes determining an initial weight of a plurality of printer paper sheets that are located within a paper feeder tray of a printer, in response to a paper sheet counting input. A single sheet of the plurality of printer paper sheets is removed from the paper feeder tray to a staging area of the printer. A revised weight is determined for the sheets located within the paper feeder tray while the single sheet of paper is removed from the paper feeder tray to the staging area, and the single sheet is fed back into the paper feeder tray via a printing path bypass of the printer. The weight of the single sheet of paper is determined as a function of the difference between the initial weight and the revised weight. A quantity of the printer paper sheets currently loaded within the paper feeder tray and available to satisfy a print job is determined as equal to the initial weight divided by the weight of the single sheet.

In another aspect, a method provides a service for a printer with automatic paper sheet count discovery. The method includes integrating computer-readable program code into a computer system including hardware processor in circuit communication with computer readable memory and a computer readable storage medium. The computer readable program code includes instructions for execution by the processor that cause the processor to perform the steps described above in the method aspects, namely determining the initial weight in response to the paper sheet counting input; removing the single sheet from the paper feeder tray to the printer staging area; determining the revised weight while the single sheet of paper is removed from the paper feeder tray to the staging area; feeding the single sheet of paper back into the paper feeder tray via the printing path bypass of the printer; determining the weight of the single sheet of paper; and determining the quantity of the plurality of printer paper sheets that are currently loaded within the paper feeder tray and available to satisfy the print job as equal to the initial weight divided by the weight of the single sheet.

In another aspect, a system has a paper tray scale that, in response to a paper sheet counting input, determines an initial weight of a plurality of printer paper sheets that are located within a paper feeder tray of a printer, and determines a revised weight of the plurality of printer paper sheets that are located within the paper feeder tray while a single sheet of paper is removed from the paper feeder tray to a staging area of the printer. A printing path bypass feeds the single sheet of paper back into the paper feeder tray from the staging area after the scale determines the revised weight of the plurality of printer paper sheets. A hardware processor executes program instructions stored on a computer-readable storage medium via a computer readable memory and thereby determines the weight of the single sheet of paper as a function of a difference between the initial weight and the revised weight; and determines a quantity of the plurality of printer paper sheets that are currently loaded within the paper feeder tray and available to satisfy a print job as equal to the initial weight divided by the weight of the single sheet.

In another aspect, a computer program product for a printer with automatic paper sheet count discovery has a computer readable storage medium with computer readable program code embodied therewith. The computer readable hardware medium is not a transitory signal per se. The computer readable program code includes instructions for execution by a processor that cause the processor to, in response to a paper sheet counting input, determine, via a paper tray scale that is in communication with the processor, an initial weight of a plurality of printer paper sheets that are located within a paper feeder tray of a printer; determine a revised weight of the plurality of printer paper sheets that are located within the paper feeder tray while a single sheet of paper is removed from the paper feeder tray to a staging area of the printer; determine a weight of the single sheet of paper as a function of a difference between the initial weight and the revised weight; and, in response to a printing path bypass feeding the single sheet of paper back into the paper feeder tray from the staging area, determine a quantity of the plurality of printer paper sheets that are currently loaded within the paper feeder tray and available to satisfy a print job as equal to the initial weight divided by the weight of the single sheet.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
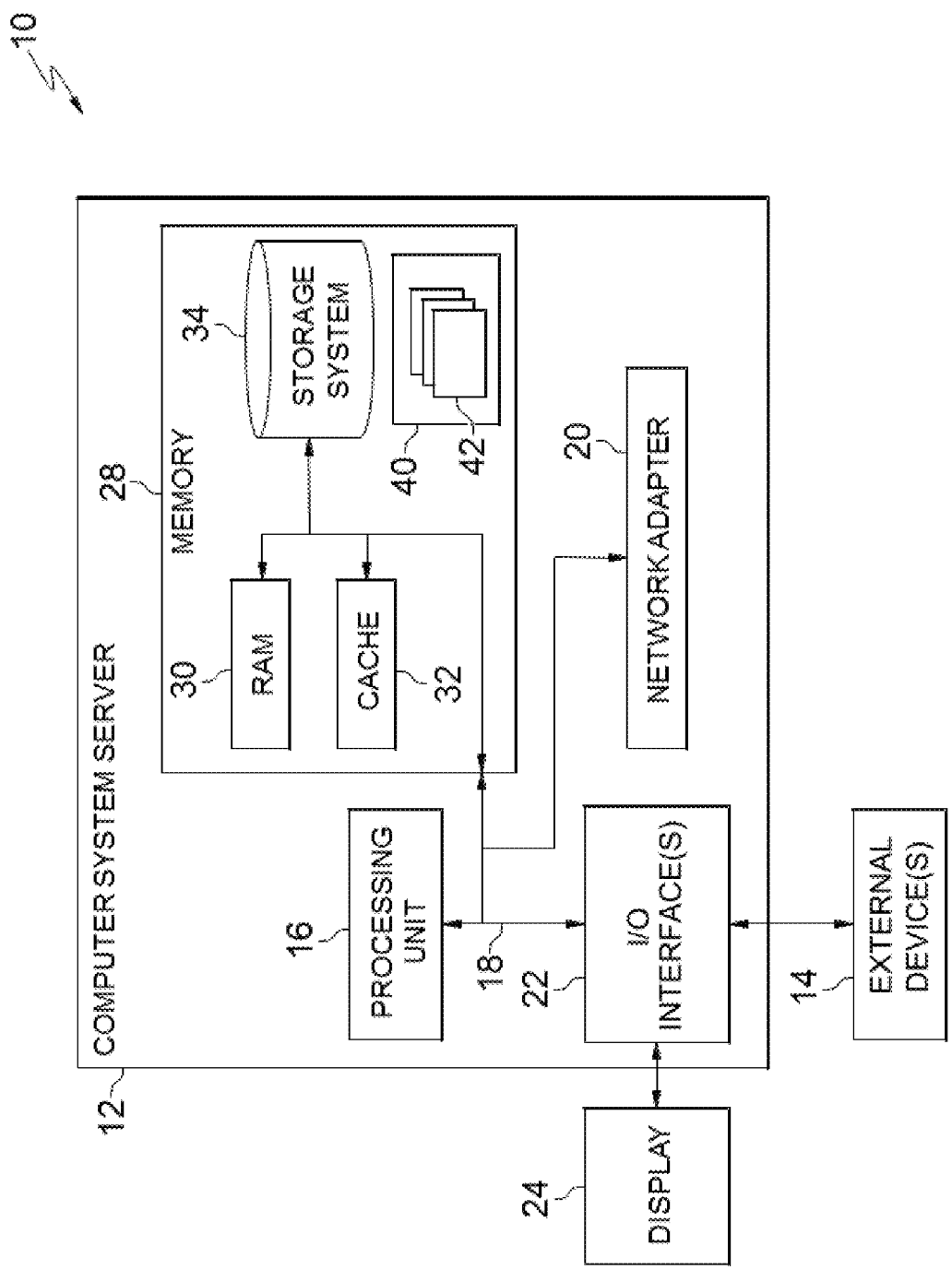
FIG. 1 depicts a computerized aspect according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a schematic of an example of a programmable device implementation 10 according to an aspect of the present invention. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
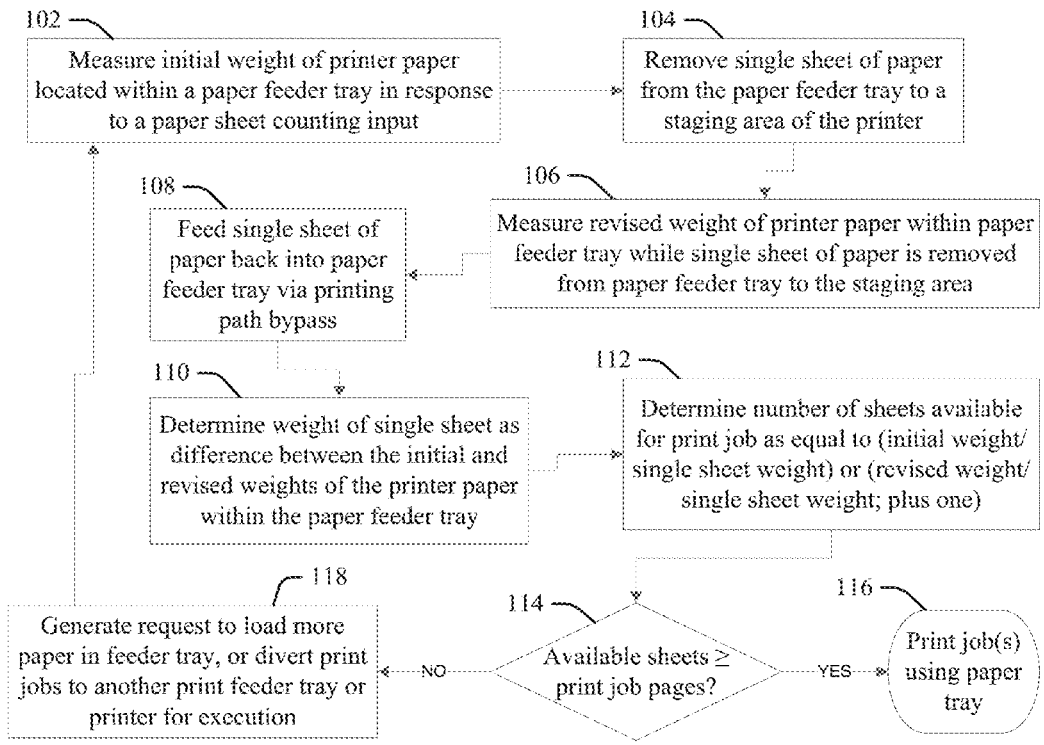
FIG. 2 is a flow chart illustration of a method or process according to an embodiment of the present invention.

FIG. 2 (or "FIG. 2") illustrates a computer implemented (method or process) of an aspect of the present invention for a printer with automatic paper sheet count discovery. A processor (for example, a central processing unit (CPU)) executes code, such as code installed on a storage device in communication with the processor, and thereby performs the process step elements illustrated in FIG. 2.

At 102, in response to a paper sheet counting input, an initial weight of printer paper located within a paper feeder tray is measured (determined).

At 104, after measuring the weight of printer paper located within the paper feeder tray at 102, a single sheet of paper is removed from the paper feeder tray to a staging area of the printer, and at 106 a revised weight of the printer paper located within the paper feeder is measured while the single sheet of paper is removed from the paper feeder tray to the staging area.

After measuring the revised weight of printer paper located within the paper feeder tray at 106, at 108 the single sheet of paper is fed back into the paper feeder tray via a printing path bypass.

At 110, the weight of the single sheet of paper is determined as the difference between the initial and revised weights of the printer paper within the paper feeder.

At 112 the number (quantity) of sheets currently loaded within the tray and available to satisfy a print job is determined as the value of the initial weight of the paper within the tray divided by the weight of the single sheet. In some alternative embodiments the quantity of sheets loaded within the tray and available to satisfy a print job is determined at 112 as the value of the revised weight of the paper within the tray divided by the weight of the single sheet, plus one, wherein the value of one is added to represent the return of the single sheet to the tray from the staging area. Accordingly, in each of the embodiments the number of sheets available for current satisfaction of a print job determined at 112 includes the single sheet that was temporally staged in the staging area during steps 104 and 106.

At 114 a print job controller verifies that the number of sheets determined as currently available at 112 is not less a number pages required to execute any requested or queued print jobs. If so, the print jobs are executed via use of the paper feeder tray at 116. If not, then at 118 a request is generated to load more paper in the feeder tray, or print jobs are diverted to another print feeder tray or printer for execution.

Figure 3:
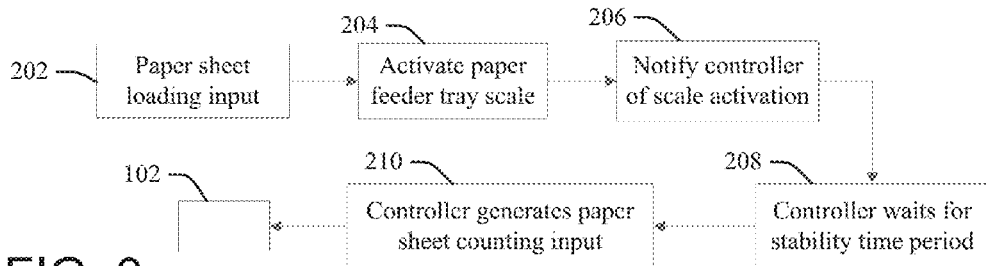
FIG. 3 is a flow chart illustration of a method or process according to another embodiment of the present invention.

FIG. 3 illustrates an alternative embodiment of the present invention wherein in response to a paper loading input 202 signifying a loading of at least one sheet of printer paper into the paper feeder tray, a scale is activated at 204 that is positioned and configured to determine the weight of paper sheets loaded in the paper feeder tray. At 206 a controller of the scale is notified of the scale activation (thereby activated by the paper loading input 202).

At 208 the controller waits for a stable weight reading ("stability") time period from the notification at 206. The wait period is configured to ensure that no physical forces are currently being imparted to the printer by persons loading paper (for example, vibrations closing a tray door for the feeder tray), or operating the printer (for example, displacement motions of the printer caused by opening or closing other trays to load or remove paper, forcefully depressing operation panel buttons to execute a print or scan job, etc.). This prevents deleterious effects from extraneous forces that interfere with or reduce accuracy in determining the weight of the paper within the feed tray.

The wait period may be determined at 208 dynamically, for example for a set period of time after no vibration or motion signals are received from the activated scale or from one or more motion sensors in communication with the controller and located on the printer, indicating that the printer doors, trays and control button panels are no longer being pushed or engaged by a person loading paper, setting print jobs, etc. The wait period may also be set from historical data to be sufficiently long as to allow vibrations from loading activities to dissipate, for example as a typical time after a closed tray door signal is received by the controller wherein motion is no longer detected by motion sensors in the historic data.

At the end of this stability period pause, at 210 the controller initiates the paper sheet counting input, which triggers the measurement of the net weight of printing paper within the feeder tray and storage of the weight result at 102 of FIG. 2, and wherein the remainder of the steps of FIG. 2 described above may be triggered and performed.

Figure 4:
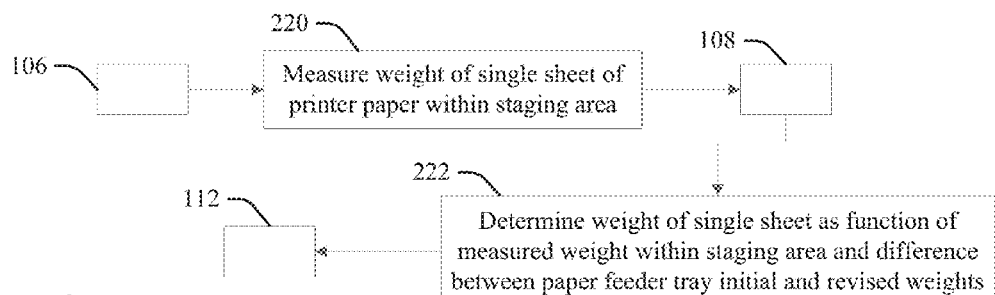
FIG. 4 is a flow chart illustration of a method or process according to another embodiment of the present invention.

FIG. 4 illustrates an alternative embodiment of the present invention wherein additional scale elements determine the weight of a single sheet of paper while it is removed to a staging area (at 104, FIG. 2). Thus, with reference generally to the elements of FIG. 2, in addition to the step at 106 of measuring the revised weight of the printer paper located within the paper feeder while the single sheet of paper is removed from the paper feeder tray to the staging area, at 220 the weight of the single sheet of paper is measured while it is in the staging area, before it is fed back into the paper feeder tray via the printing path bypass at 108. Thus, in a variation of step 110 of FIG. 2, at 222 the weight of the single sheet is determined as function of measured weight within staging area and the difference between paper feeder tray initial and revised weights (for example, as an average of the values, wherein one may be weighted more highly than the other). The determined weight of the single sheet is then used to determine the number of sheets available for print job (as equal to (initial weight/single sheet weight)) at 112, wherein the remainder of the steps of FIG. 2 may be achieved.

Aspects may continuously verify the page count determined by weight during printing and after print jobs, which may refine the estimate for any given single sheet of paper pulled from the top before it is printed. Thus, some printers may route each page through the bypass and re-weighting steps 104 through 112 of FIG. 2 before passing the top page on to printing through the print path. This capacity provides advantages wherein different kinds of paper having different weights may be mixed into a common load of paper within the tray. By continually verifying a current paper count estimate via pulling subsequent top sheets into the bypass area and re-weighing the remaining paper load and re-determining the number of sheets remaining, the determined number will be revised to reflect different, more-accurate counts where subsequent top pages have a different weight relevant to previous iterations.

The computed number of pages may be published on an ongoing and dynamic basis, for example displayed on the printer display or within a print dialog box at the time of a request for a print job.

Figure 5:
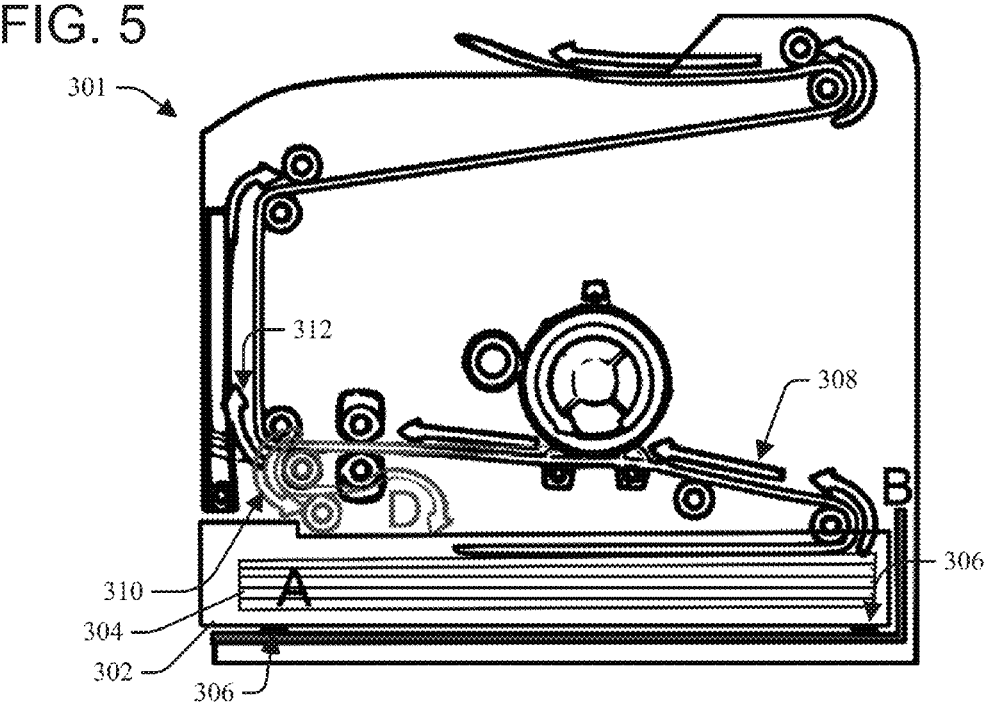
FIG. 5 is a graphic illustration of a printer that incorporates an embodiment of the present invention.

FIG. 5 illustrates an embodiment of the present invention wherein a printer 301 has a paper feed tray "A" 302 that contains a loaded stack of printer paper sheets 304. A plurality of weight sensors 306 are deployed beneath the paper feed tray 302 to detect the weight of the tray 302. Two weight sensors 306 are visible in this view, though any other number of weight sensors may be practiced, for example, one, three, or four or more. A staging area "B" 308 holds the single top sheet of paper removed from the paper feeder tray 302 (at step 104, FIG. 2) while the revised weight of stack of loaded paper 304 is obtained (at 106, FIG. 2). The top sheet is then returned to the paper feeder tray 302 via a printing path bypass 310 (at 108, FIG. 2). When sheets within the paper feeder tray 302 are printed, they are pulled from the tray through the staging area 308 and then sent on through a printing path 312 for printing by the printer 301.

Figure 6:
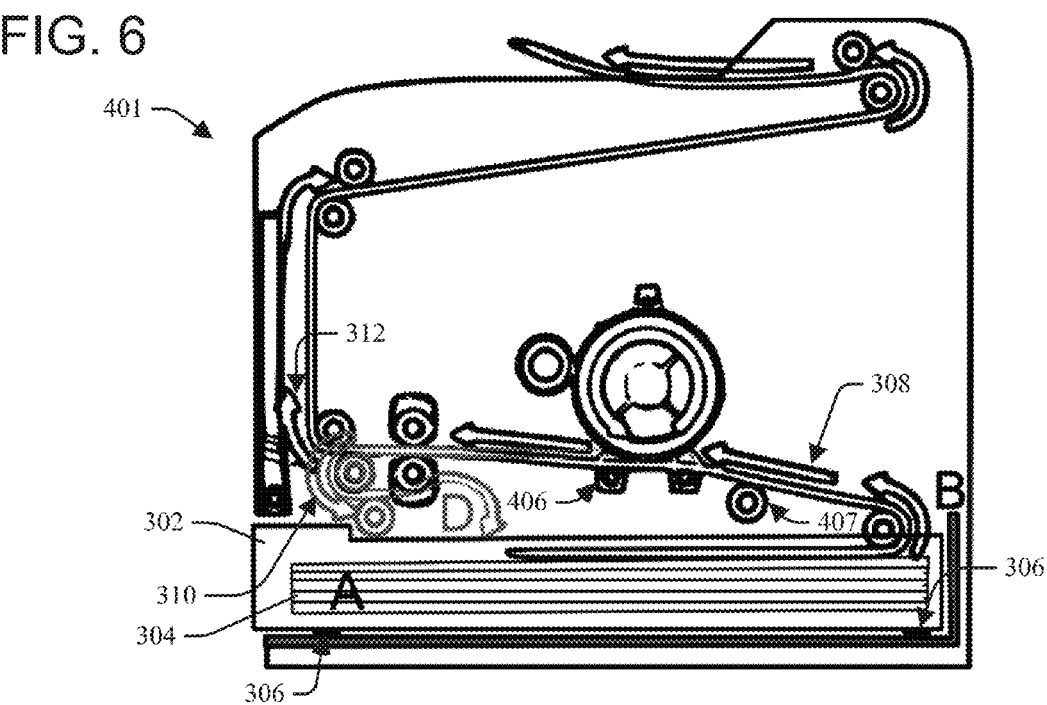
FIG. 6 is a graphic illustration of a printer that incorporates another embodiment of the present invention.

FIG. 6 illustrates another embodiment of the present invention wherein a printer 401 has one or more additional weight sensors 406 and 407 are deployed in the staging area "B" 308 in order to weigh the single top sheet of paper staged therein after removal from the paper feeder tray 302 (at step 220, FIG. 3) while the revised weight of stack of loaded paper 304 is obtained. Two staging area weight sensors 406 and 407 are visible in this view, though any other number of weight sensors may be practiced, for example, one, three, or four or more. Similar to the printer embodiment of FIG. 5, the top sheet is returned to the paper feeder tray 302 via a printing path bypass 310, and when sheets within the paper feeder tray 302 are printed they are pulled from the tray through the staging area 308 and then sent on through a printing path 312 for printing by the printer 401.

Aspects of the present invention detect how many paper sheets are available for printing in the paper feeder of the printer, via monitoring a paper feeder each time a user reloads it with some paper sheets. The weight of a paper sheet and/or aggregate paper feeder content is measured and used to calculate a number of available sheets accordingly.

Aspects provide accurate counting of remaining paper sheets, which provides advantages over the prior art in the management of shared printers in a network. In response to this information a user submitting a print job is given notice as to whether the printer has enough sheets to execute the job, and may thereby ensure successful execution of the job, for example by delaying submission of the job until a current count shows a sufficient number, adding more paper to an appropriate supply tray, or requesting the timely addition of more paper by a service provider, etc. Technicians and other service providers responsible for maintaining or operating the printer may also be given early notice of deficient counts that cannot satisfy an executing or pending (queued) job, so that they may intervene and add more paper before a paper feeder runs out of paper, and thereby ensure that the print jobs will be successfully executed without return of an error message.

Some prior art approaches to printer supply management use print medium-type sensors deployed within a printer to detect and distinguish between different types of print mediums loaded in a supply tray and available for use by the printer in execution of a requested print job, for example plain paper, coated paper, photo paper, transparency film, etc. However, for multi-page jobs a printer using such an approach generally proceeds under the assumption that the type of subsequent pages in a multi-page print job is the same as the type determined (detected) from the supply tray for the first page, so the printer will not recognize differences in paper type in the subsequent pages that may have different thicknesses or weights that will result in errors for page counts count remaining sheets in the paper tray. While some prior art printers use weight sensors to monitor the waste ratio of materials for each roll of paper, such approaches do not provide accurate counts of available paper on a dynamic basis during the execution and queueing of print jobs.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for a printer with automatic paper sheet count discovery, the method comprising executing on a computer processor the steps of:
   in response to a paper loading input, activating a controller of a paper tray scale that is positioned and configured to determine an initial weight of the plurality of printer paper sheets that are located within a paper feeder tray of the printer;
   at lapse of a stability time period from a time of the paper loading input, initiating via the controller a paper sheet counting input;
   in response to the paper sheet counting input, determining an initial weight of the plurality of printer paper sheets that are located within the paper feeder tray of the printer;
   removing a single sheet of the plurality of printer paper sheets from the paper feeder tray to a staging area of the printer;
   determining a revised weight of the plurality of printer paper sheets that are located within the paper feeder tray while the single sheet of paper is removed from the paper feeder tray to the staging area;
   feeding the single sheet of paper back into the paper feeder tray via a printing path bypass of the printer;
   determining a weight value for the single sheet of paper as a function of a difference between the initial weight and the revised weight of the plurality of printer paper sheets; and
   determining a quantity of the plurality of printer paper sheets that are currently loaded within the paper feeder tray and available to satisfy a print job as equal to the initial weight of the plurality of printer paper sheets divided by the weight value determined for the single sheet of paper.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the steps of activating the controller of the paper tray scale in response to the paper loading input, initiating via the controller the paper sheet counting input at the end of the stability period lapse of time from the time of the paper loading input, determining the initial weight in response to the paper sheet counting input, removing the single sheet from the paper feeder tray to the printer staging area, determining the revised weight while the single sheet of paper is removed from the paper feeder tray to the staging area, feeding the single sheet of paper back into the paper feeder tray via the printing path bypass of the printer, determining the weight value for the single sheet of paper, and determining the quantity of the plurality of printer paper sheets that are currently loaded within the paper feeder tray and available to satisfy the print job as equal to the initial weight of the plurality of printer paper sheets divided by the weight value determined for the single sheet of paper.

3. The method of claim 1, wherein the paper loading input signifies action of a user physically engaging the printer to load paper into the paper feeder tray; and wherein an end time of the stability period lapse of time is a time at which motion signals are no longer received from a motion sensor located on the printer and in communication with the controller.

4. The method of claim 1, wherein a length of time of the stability period is determined from historical data to be sufficiently long as to allow vibrations from loading activities associated with the paper loading input to dissipate.

5. The method of claim 1, further comprising:
determining a measured weight of the single sheet of paper while it is in the staging area, via a staging area scale that is located to engage the staging area; and
wherein the step of determining the weight value for the single sheet of paper is a function of the difference between the initial weight and the revised weight of the plurality of printer paper sheets, and of the measured weight of the single sheet of paper.

6. The method of claim 5, wherein the step of determining the weight value for the single sheet of paper comprises averaging values of the difference between the initial weight and the revised weight of the plurality of printer paper sheets, and of the measured weight of the single sheet of paper.

7. The method of claim 6, wherein the step of averaging the values of the difference between the initial weight and the revised weight of the plurality of printer paper sheets and of the measured weight of the single sheet of paper comprises weighting one of the values different than another of the values.

8. A system, comprising:
a paper tray scale that is positioned and configured to determine an initial weight of a plurality of printer paper sheets that are located within a paper feeder tray of a printer;
a controller in communication with the paper tray scale that, in response to a paper loading input, activates the paper tray scale and initiates a paper sheet counting input at lapse of a stability time period from a time of the paper loading input, wherein in response to the paper sheet counting input, the paper tray scale determines an initial weight of the plurality of printer paper sheets that are located within the paper feeder tray of the printer, and determines a revised weight of the plurality of printer paper sheets that are located within the paper feeder tray while a single sheet of paper is removed from the paper feeder tray to a staging area of the printer;
a printing path bypass that feeds the single sheet of paper back into the paper feeder tray from the staging area after the scale determines the revised weight of the plurality of printer paper sheets; and
a processor in circuit communication with a computer readable memory processor and a computer readable storage medium, wherein the processor executes program instructions stored on the computer-readable storage medium via the computer readable memory and thereby:
determines a weight value for the single sheet of paper as a function of a difference between the initial weight and the revised weight of the plurality of printer paper sheets; and
determines a quantity of the plurality of printer paper sheets that are currently loaded within the paper feeder tray and available to satisfy a print job as equal to the initial weight of the plurality of printer paper sheets divided by the weight value determined for the single sheet of paper.

9. The system of claim 8, further comprising:
a motion sensor located on the printer and in communication with the controller; and
wherein an end time of the stability period lapse of time is a time at which motion signals are no longer received by the controller from the motion sensor.

10. The system of claim 8, wherein the processor determines a length of time of the stability period from historical data to be sufficiently long as to allow vibrations from loading activities associated with the paper loading input to dissipate.

11. The system of claim 8, further comprising:
a staging area scale that is located to engage the staging area; and
wherein the processor executes the program instructions stored on the computer-readable storage medium via the computer readable memory and thereby further:
determines, via the staging area scale, a measured weight of the single sheet of paper while it is in the staging area; and
determines the weight value for the single sheet of paper as a function of the difference between the initial weight and the revised weight of the plurality of printer paper sheets, and of the measured weight of the single sheet of paper.

12. The system of claim 11, wherein the processor executes the program instructions stored on the computer-readable storage medium via the computer readable memory and thereby determines the weight value for the single sheet of paper by averaging values of the difference between the initial weight and the revised weight of the plurality of printer paper sheets, and of the measured weight of the single sheet of paper.

13. The system of claim 12, wherein the processor executes the program instructions stored on the computer-readable storage medium via the computer readable memory and thereby averages the values of the difference between the initial weight and the revised weight of the plurality of printer paper sheets and of the measured weight of the single sheet of paper by weighting one of the values different than another of the values.

14. A computer program product for a printer with automatic paper sheet count discovery, the computer program product comprising:
a computer readable storage medium having computer readable program code embodied therewith, wherein the computer readable storage medium is not a transitory signal per se, the computer readable program code comprising instructions for execution by a processor that cause the processor to:
in response to a paper loading input, activate a paper tray scale that is in communication with the processor;
at lapse of a stability time period from a time of the paper loading input, initiate a paper sheet counting input;
in response to a paper sheet counting input, determine, via the paper tray scale that is in communication with the processor, an initial weight of a plurality of printer paper sheets that are located within a paper feeder tray of a printer;
determine a revised weight of the plurality of printer paper sheets that are located within the paper feeder tray while a single sheet of paper is removed from the paper feeder tray to a staging area of the printer;
determine a weight value for the single sheet of paper as a function of a difference between the initial weight and the revised weight of the plurality of printer paper sheets; and in response to a printing path bypass feeding the single sheet of paper back into the paper feeder tray from the staging area, determine a quantity of the plurality of printer paper sheets that are currently loaded within the paper feeder tray and available to satisfy a print job as equal to the initial weight of the plurality of printer paper sheets divided by the weight value determined for the single sheet of paper.

15. The computer program product of claim 14, wherein the paper loading input signifies action of a user physically engaging the printer to load paper into the paper feeder tray; and wherein an end time of the stability period lapse of time is a time at which motion signals are no longer received from a motion sensor located on the printer and in communication with the paper tray scale.

16. The computer program product of claim 14, wherein the computer readable program code instructions for execution by the processor further cause the processor to determine a length of time of the stability period from historical data to be sufficiently long as to allow vibrations from loading activities associated with the paper loading input to dissipate.

17. The computer program product of claim 14, wherein the computer readable program code instructions for execution by the processor further cause the processor to:

determine a measured weight of the single sheet of paper while it is in the staging area, via a staging area scale that is located to engage the staging area; and determine the weight value for the single sheet of paper as a function of averaging a value of the difference between the initial weight and the revised weight of the plurality of printer paper sheets, and a value of the measured weight of the single sheet of paper.

* * * * *